United States Patent
Partridge et al.

(10) Patent No.: US 12,061,846 B2
(45) Date of Patent: Aug. 13, 2024

(54) SIMULATION AND VALIDATION OF AUTONOMOUS VEHICLE SYSTEM AND COMPONENTS

(71) Applicant: FORETELLIX LTD., Ramat Gan (IL)

(72) Inventors: Chad Partridge, Burlingame, CA (US); Paul Scott, Los Altos Hills, CA (US); Michael Savchenko, Berkeley, CA (US); Daniel Schambach, San Carlos, CA (US)

(73) Assignee: FORETELLIX LTD., Ramat Gan (IL)

( * ) Notice: Subject to any disclaimer, the term of this patent is extended or adjusted under 35 U.S.C. 154(b) by 669 days.

(21) Appl. No.: 16/783,842

(22) Filed: Feb. 6, 2020

(65) Prior Publication Data
US 2020/0250363 A1    Aug. 6, 2020

Related U.S. Application Data

(60) Provisional application No. 62/802,108, filed on Feb. 6, 2019.

(51) Int. Cl.
*G06F 30/15* (2020.01)
*G06F 30/20* (2020.01)
*G06F 111/10* (2020.01)

(52) U.S. Cl.
CPC .............. *G06F 30/20* (2020.01); *G06F 30/15* (2020.01); *G06F 2111/10* (2020.01)

(58) Field of Classification Search
CPC .................................. G06F 30/15; G06F 30/20
See application file for complete search history.

(56) References Cited

U.S. PATENT DOCUMENTS 10,599,546 B1 *  3/2020  Walther ............... G06F 11/3013
10,816,978 B1 * 10/2020  Schwalb .............. G05D 1/0088
(Continued)

FOREIGN PATENT DOCUMENTS

| DE | 102011088807 A1 * | 6/2013 | ............ G06F 30/15 |
| DE | 102013200116 A1 * | 7/2014 | ............ G06F 30/20 |
| EP | 3121729 B1 | 9/2018 | |

OTHER PUBLICATIONS

Zhao et al., "Accelerated Evaluation of Automated Vehicles", University of Michigan, 2016, PhD Dissertation (Year: 2016).*
(Continued)

*Primary Examiner* — Boris Gorney
*Assistant Examiner* — David A Hopkins
(74) *Attorney, Agent, or Firm* — M&B IP Analysts, LLC

(57) ABSTRACT

Performing a test simulation for an autonomous vehicle may include receiving a system under test (SUT) from a user, the system under test comprising a sensor, sensor control, vehicle control logic, or other aspect of an autonomous vehicle, and providing options for the remaining aspects of the simulation from which the user may choose. The user may indicate a variable parameter, and respective simulations may be performed for a plurality of values of the variable parameter to determine values of the parameter for which the SUT functions as desired, and values of the variable parameter for which the SUT does not function as desired. Separate container instances of the simulation engine and separate respective container instances of the SUT may be created for each simulation, with each engine container instance calling to a respective SUT container.

20 Claims, 11 Drawing Sheets

(56) References Cited

U.S. PATENT DOCUMENTS

| | | | |
|---|---|---|---|
| 2010/0088560 | A1 | 4/2010 | Chakravarthy et al. |
| 2010/0158242 | A1 | 6/2010 | Asher |
| 2016/0245979 | A1* | 8/2016 | Park .................. G02B 6/0038 |
| 2017/0286570 | A1* | 10/2017 | Kim ..................... G06F 30/20 |
| 2017/0316134 | A1* | 11/2017 | Hyodo ................. G06F 30/33 |
| 2018/0060459 | A1 | 3/2018 | English et al. |
| 2018/0121183 | A1* | 5/2018 | Subramaniyan .......... G06F 8/60 |
| 2019/0042679 | A1* | 2/2019 | Stefan .................. G06F 30/20 |
| 2019/0087307 | A1* | 3/2019 | Zhan ................ G06F 11/3664 |
| 2019/0155291 | A1* | 5/2019 | Heit .................. B60W 30/00 |
| 2020/0042657 | A1* | 2/2020 | Todd .................. G06F 30/20 |

OTHER PUBLICATIONS

Avino, Giuseppe, et al. "Characterizing docker overhead in mobile edge computing scenarios." Proceedings of the Workshop on Hot Topics in Container Networking and Networked Systems. 2017. (Year: 2017).*

Concas, Matteo, et al. "Plancton: an opportunistic distributed computing project based on Docker containers." Journal of Physics: Conference Series. vol. 898. No. 9. IOP Publishing, 2017 (Year: 2017).*

Jia, Yunhan Jack, et al. "Towards secure and safe appified automated vehicles." 2017 IEEE Intelligent Vehicles Symposium (IV). IEEE, 2017. (Year: 2017).*

Kämäräinen, Teemu, et al. "Virtual machines vs. containers in cloud gaming systems." 2015 international workshop on network and systems support for games (netgames). IEEE, 2015. (Year: 2015).*

LaRochelle, Ethan PM, Pedro Arce, and Brian W. Pogue. "Monte Carlo modeling photon-tissue interaction using on-demand cloud infrastructure." arXiv preprint arXiv:2005.01108 (2020). (Year: 2020).*

Altaf, Umer, et al. "Auto-scaling a defence application across the cloud using Docker and Kubernetes." 2018 IEEE/ACM International Conference on Utility and Cloud Computing Companion (UCC Companion). IEEE, 2018. (Year: 2018).*

Mittal, Saurabh, and José L. Risco-Martín. "DEVSML 3.0 stack: rapid deployment of DEVS farm in distributed cloud environment using microservices and containers." Proceedings of the Symposium on Theory of Modeling & Simulation. 2017. (Year: 2017).*

O'Kelly, Matthew, et al. "Scalable end-to-end autonomous vehicle testing via rare-event simulation." arXiv preprint arXiv: 1811.00145 (2018). (Year: 2018).*

SAE, "Mobility Engineering", Quarterly Publication, Dec. 2017, vol. 4 Issue 4—the article "Simulation to the Rescue" (Year: 2017).*

Hollander et al., "The "Synthetic Sensor Input" problem in AV verification", Foretellix Blog, Jan. 17, 2017 (Year: 2017).*

Zofka, Marc René, et al. "Testing and validating high level components for automated driving: simulation framework for traffic scenarios." 2016 IEEE intelligent vehicles symposium (IV). IEEE, 2016. (Year: 2016).*

Kirchhof, Jörg Christian, et al. "Simulation as a service for cooperative vehicles." 2019 ACM/IEEE 22nd International Conference on Model Driven Engineering Languages and Systems Companion (MODELS-C). IEEE, 2019. (Year: 2019).*

Silver, Andrew. "Software simplified." Nature 546.7656 (2017): 173-174. (Year: 2017).*

ISA/US, International Search Report and Written Opinion issued in PCT/US20/17022, dated Jun. 5, 2020, 17 pgs.

"European Search Report for EP20753057.7" European Patent Office, Munich, Germany. Dated Feb. 9, 2023.

* cited by examiner

SIMULATION AND VALIDATION OF AUTONOMOUS VEHICLE SYSTEM AND COMPONENTS

CROSS-REFERENCE TO RELATED APPLICATION

This application claims priority to U.S. provisional application No. 62/802,108, filed Feb. 6, 2019, hereby incorporated by reference in its entirety.

TECHNICAL FIELD

This disclosure generally relates to the simulation, validation, and/or training of an autonomous vehicle system, including but not limited to the control system for the vehicle, sensor arrangement of the vehicle, and/or other aspects of the system.

BACKGROUND

Autonomous (i.e., self-driving) vehicle systems require vast amounts of testing to be safe for deployment on public roadways. In general, known methods and systems for testing autonomous vehicle systems include extensive live testing, using real vehicles, real roadways, and real obstacles. As a result, systematic testing of the control systems and other features of an autonomous vehicle according to such methods and systems is generally constrained by the limited availability of live vehicles, pedestrians, roadways, etc. in a testing environment that does not endanger the public, and by the difficulty in creating a static environment and/or reproducible events that permit testing of specific aspects of the vehicle system while controlling environmental variables.

DETAILED DESCRIPTION

Known methods and systems for testing, validating, and training autonomous vehicle systems and components can be improved upon according to the teachings of the present disclosure. In some embodiments, a digital simulation environment may be provided in which various aspects of an autonomous vehicle system may be virtually tested and validated. As will be described in greater detail, testing of an autonomous vehicle system according to the present disclosure may include parameterizing one or more features of the autonomous vehicle system, such as (i) the quantity, placement, and/or programming of sensors; (ii) aspects of the control programming of the autonomous vehicle (e.g., response strategies to particular stimuli or events); and/or (iii) features of the vehicle itself (e.g., dimensions, acceleration and turning performance, etc.), and performing a large set of simulations over the parameterized feature space. In addition to features of the vehicle, environmental conditions may be parameterized, including weather conditions, vehicle traffic, pedestrian traffic, traffic light timing, etc.

An autonomous vehicle simulator according to the present disclosure may include a container-based testing architecture in which a user may provide a container of the portion of an autonomous vehicle or sensor software stack, such as a portion of a control system or perception system (e.g., one or more sensors or sensor controllers), that the user would like to test and validate, in combination with a container of other aspects of the test (e.g., other portion of the control system, the roadway, the environment, other aspects of the vehicle, etc.) provided by third parties, that are publicly-available, or otherwise provided by the testing software. As a result, the instant disclosure provides a highly flexible simulation architecture that enables a user to test specific portions of an autonomous vehicle, such as a control system or portions thereof, a perception system or portion thereof, etc., without requiring the user to provide the entire autonomous vehicle, entire control system, or entire perception system.

Figure 1:
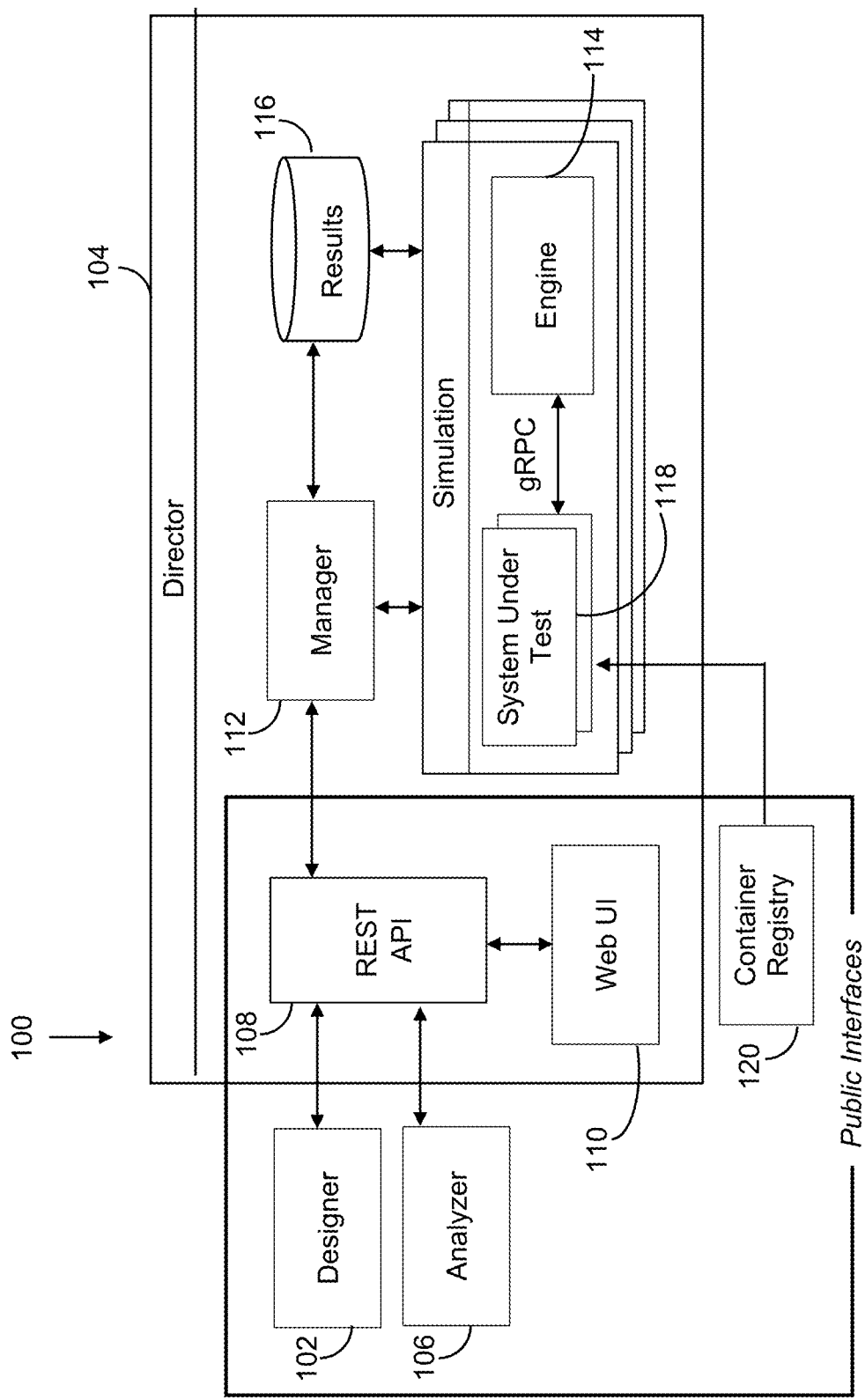
FIG. 1 is a diagrammatic view of an example system for simulation, validation, and/or training of an autonomous vehicle system and its components.

Referring now to the drawings, wherein like numerals refer to the same or similar features in the various views, FIG. 1 is a diagrammatic view of an example system 100 for testing and validation of an autonomous vehicle system. The system 100 may include a number of functional modules embodied in hardware and/or software. In embodiments, each of the functional modules described herein may be embodied in one or more non-transitory, computer-readable memory devices storing computer-readable instructions that, when executed by a processor, cause the processor to perform the described functionality of the module.

A user of the system 100 may be a proprietor of an autonomous vehicle system or another entity that wishes to test an autonomous vehicle system or one or more components of an autonomous vehicle system. In some embodiments, one or more of the modules described herein may be embodied in the user's local computing resources. Additionally or alternatively, one or more of the modules may be embodied in cloud-based computing resources, accessible to the user through a browser or other interface.

The system 100 may include a Designer module 102 (which may be referred to herein simply as the "Designer 102"), a Director module 104 (which may be referred to herein simply as the "Director 104"), and an Analyzer module 106 (which may be referred to herein simply as the "Analyzer 106"), as well as other functional modules and components that will be described below. As will be described in further detail below and in the appendices to this disclosure, generally, the Designer 102 comprises an interface through which the details of desired autonomous vehicle simulations are received from a user, the Director 104 performs the desired simulations, and the Analyzer 106 presents the results of the simulations to the user.

The instant disclosure will discuss systems and methods, generally with reference to the simulation and test of a single ego vehicle, for ease of description. It should be noted that the systems and methods of the present disclosure, however, may be applied to simulate and test two or more ego vehicles in a single simulation (e.g., in the same scene, such that the two or more ego vehicles may interact with one another in the simulation) or series of simulations. If two or more ego vehicles are included in a simulation, the same or different parameters may be parameterized for those ego vehicles over instances of the simulation, in different embodiments.

The Designer 102 may include a user interface, such as a graphical user interface, through which the user enters one or more aspects of a desired simulation. The user may enter aspects including scenario details and vehicle details. A scenario may include one or more scenes—each including, e.g., a road network, weather and other environmental details, stationary obstacles, other static details of the virtual environment in which the simulations will take place, and dynamic actors in the scene, including pedestrian and vehicle traffic. The user may select from a predetermined set of scenario details (e.g., a predetermined road network, such as a freeway, urban block, parking lot, etc.), or may define the user's own scenario or scenario aspects. For example, the user may define the user's own road network.

In defining a scenario, a user may detail a specific circumstance or event for which the user would like to test the autonomous vehicle. For example, the user may detail the presence of traffic vehicles and/or pedestrians taking specific actions at specific times. Additionally or alternatively, the user may more generally input details of the environment—number of traffic vehicles, number of pedestrians, presence of stoplights, etc.—and the system of the present disclosure may provide randomized (and, in embodiments, parameterized) simulation of the behavior of those vehicles, pedestrians, stoplights, etc.

As noted above, through the Designer 102, the user may also specify vehicle details that is, details of an autonomous vehicle under test (which may be referred to in this disclosure as the "ego vehicle"). The vehicle details may include, for example, the type, number, location, and/or performance of sensors on the vehicle. For example, the user may specify the number, location, and performance of one or more radar, laser, lidar, camera, GPS, IMU, localizer, and/or other sensors useful for detecting the environment around the autonomous vehicle on the ego vehicle (that is, on the digital representation of the ego vehicle) or the location in space of the ego vehicle. In an embodiment, the user may provide the specific firmware for one or more sensors in order to test and evaluate the performance of that sensor firmware. Additionally or alternatively, the user may define hardware aspects of one or more sensors (e.g., the beam width of a radar sensor, power of a laser, etc.) in order to test and evaluate the performance of that hardware arrangement.

In addition to sensors, other vehicle details that the user may provide may include the ego vehicle body dimensions and performance characteristics of the ego vehicle, such as turning radius, engine or motor torque profile, etc. In embodiments, such details may be respective of commercially-available vehicles, and may be derived from vehicle manufacturer data or third-party testing of such vehicles. Additionally or alternatively, performance characteristics and body dimensions of a given ego vehicle may be generic so as to represent performance and body dimensions typical of a class of vehicle (e.g., small coupe, four-door sedan, small SUV, large panel van, etc.).

In the Designer, the user may also specify a starting location for the ego vehicle, as well as an intended destination and/or desired path for the ego vehicle through the road network. The user may also specify one or more failure conditions (which may also be referred to herein as pass/fail conditions) of a test, which may be monitored relative to the SUT in a simulation. In some embodiments, a failure condition may be a behavior or event respective of the ego vehicle. In some embodiments, a failure condition may be a behavior or event respective of a sensor on the ego vehicle. In some embodiments, a failure condition may be specified by a user.

Through the Designer 102, the user may define one or more parameterized features of the scenario or the vehicle. For example, one or more of the following features may be parameterized: (i) the quantity, placement, and/or software and hardware settings of one or more sensors; (ii) aspects of the control programming of the autonomous vehicle (e.g., response strategies to particular stimuli or events); (iii) features of the vehicle itself (e.g., dimensions, weight, engine parameters, gearbox parameters, tires, acceleration and turning performance, color, etc.); (iv) weather; (v) vehicle traffic presence, quantity, vehicle type, and/or behavior; (vi) pedestrian traffic presence, quantity, and/or behavior; (vii) traffic light timing; (viii) one or more aspects of the road network (e.g., number of lanes for a particular stretch of road, width of a parking aisle, lane markings, parking space markings, etc.); (ix) time of day; and/or other features of the scenario or ego vehicle. For a parameterized feature, the user may provide a set of fixed values or define a range of values over which simulations are desired. For example, the user may choose to parameterize precipitation only, and may define a range of rainfall or snowfall rates. The user instead may choose to parameterize precipitation and placement of a specific radar sensor, and may define a set of positions on the ego vehicle for the radar sensor as well as the range of rainfall or snowfall rates. Any number and combination of features may be parameterized for simulation.

As illustrated in FIG. 1, the Designer 102 may interact with the Director 104 via a representational state transfer (REST) API 108, in embodiments. The interface of the Designer 102 may be a local application executing on the user's computing device, or may be provided on a server and accessed by the user through a web user interface. Similarly, the user may provide data specified through the Designer 102 to the Director 104 though the REST API 108 and/or through interaction with a web user interface 110 of the Director. The user's input in the Designer 102 may be received by the Director 104 through any appropriate transmission of data.

The Director 104 may include hardware and software modules that enable the Director 104 to perform simulations according to the data received from the user through the Designer. Such hardware and software may include the REST API 108 and web interface 110, a manager 112, a simulation engine 114, and a results database 116. The modules of the Director 104 may be implemented remote from the user, such as in the cloud, in embodiments.

The manager 112 may control the exchange of data within the Director 104 and between the Director 104 and other modules, in embodiments, to enable the Director 104 to perform the functionality described herein.

Generally, for a single simulation, the simulation engine 114 may simulate a scenario, may simulate a system under test ("SUT") 118 in the scenario (or multiple SUTs 118 in the scenario), and may record data respective of the scenario and the SUT(s) 118 for later review by the user.

As indicated by the numerous iterations of the simulation 119 in FIG. 1, the engine may perform separate simulations of numerous different versions of the system under test 118. As indicated by the numerous iterations of the system under test 118, each of those simulations 119 may include up to multiple systems under test 118, in some embodiments. The different simulations 119 may differ from each other according to one or more parameterized features. For example, in an embodiment, the Director 104 (e.g., under control of the manager 112) may apply the simulation engine 114 to the simulations 119 to perform a Monte Carlo simulation of a system under test 118. In some embodiments, a probability distribution may be applied to select values for a parameterized feature from within its value range. In some embodiments, the various possible combinations of parameterized feature values may be handled in one of the following ways by the Director 104, for example:

Exhaustive: the Director 104 executes a simulation for each possible combination of parameterized feature value.

Random over parameters: The user selects, in the Designer 102, the upper bound of number of simulations to execute and the Director 104 automatically selects combinations of parameterized feature values for that number of simulations.

Edges only: the Director executes a simulation for each combination of parameterized feature values at the edges of each value range. For 3 parameterized features, an edges-only strategy would include 8 simulations, for example.

Single simulation: the Director 104 executes a single simulation using the a specified value of each parameterized feature (e.g., the center of the value range of each parameterized feature).

As noted above, a user may define a specific set of values or a range of values for a parameterized feature. In embodiments in which the user specifies a range of values, the Director 104 may select a plurality of values within that range for simulation (e.g., three or more values). In an embodiment, the Director 104 may select such values to be evenly-spaced within the range. In other embodiments, the Director may select such values to be random within the range (e.g., according to a probability distribution), or may otherwise select values within the range.

The simulation engine 114 may incorporate modules for the simulation of all aspects of the simulation environment, including weather, vehicle dynamics, collision physics, pedestrian behavior, traffic vehicle behavior and dynamics, road, building, and other obstacle appearance, sensor performance, etc. Modules for the simulation of such aspects are generally commercially available and known to one of skill in the art.

In embodiments, the functionality of one or more sensors are simulated through the Director 104. The underlying mathematical models of such sensors may be based on known physics of the interaction between a sensor's sensing means (e.g., a laser, electromagnetic pulses for radar, etc.), applied in the digital simulated scene through ray tracing techniques, computer shaders, finite difference analysis, finite element analysis, finite volume analysis, method of moments and/or simplified models. Physics-based models may replicate how the sensor hardware works in the real world by simulating the transmitter and/or the receiver of the sensor and conducting signal processing, image processing and numerical analysis on the transmitted/received data. For example, the Director may simulate the emission of electromagnetic waves from Lidar and radar sensors into the scene, the travel of such waves to intersecting objects in the scene, the reflection, refraction, and/or absorption of such waves by the intersected objects, the reflected or refracted travel of such waves from the objects, and the receipt of reflected and refracted waves by the sensor receiver. The underlying sensor model then analyzes the received energy and calculates the sensor outputs. The magnitude of the received energy not only depends on the transmitter energy, but also on the material properties of the intersected object, the geometry and color of the object, the angle of incidence, the weather condition and the amount of wetness and dirtiness of the intersected object. All of these aspects may be simulated by the Director 104, in embodiments. The transmitter and the receiver may or may not be at the same position.

In embodiments, the ray tracer may fire more than one ray for each simulated energy wave to (1) obtain the waveform time-dependent reflected signal, (2) conduct shooting-and-bouncing-rays (SBR) analysis or (3) conduct signal processing. The Lidar model may conduct numerical analysis on the waveform data to report multiple returns per firing. The user may either use the predefined patterns for the ray distribution for each simulated wave beam or define the patterns in the sensor configuration.

A container registry 120 may store one or more aspects of the user's system under test. The container registry 120 may be a source from which the Director 104 creates an instance of the SUT (or portion thereof) for a given simulation. Accordingly, the user may input (e.g., upload or make available) one or more SUTs to the container registry 120, which SUTs the Director 104 may use in various simulations 119. The user may input discrete portions of one or more SUTs to container registry 120, in some embodiments, to the extent the user wishes to independently or separately test those portions. Accordingly, one or more aspects of the system under test 118 may be received from the container registry 120.

The simulation engine 114 may include, for example, firmware for publicly-available sensors, performance characteristics for actual vehicles, known firmware or firmware portions for commercially-available autonomous vehicles, physics models, weather models, perception models (e.g., how the output of one or more sensors is translated into the presence, location, velocity, etc. of one or more objects) and the like. The simulation engine 114 may serve as a source of "control" aspects of a given simulation, in order to test the components and features of the SUT(s) of the user.

The container-based approach of the Director 104 advantageously enables a user to provide a component of an autonomous vehicle control system—e.g., a specific sensor, a specific sensor arrangement, a specific vehicle control strategy for a specific event—and thoroughly test that component under a wide range of environmental conditions and/or in combination with a wide range of the other components of the autonomous vehicle control system. In addition, as described in greater detail elsewhere in this disclosure, the container-based approach of the Director 104 enables portability and platform independence (e.g., enables the Director to incorporate SUTs in numerous different programming languages and to incorporate numerous different SUT aspects and combinations of aspects) and isolation and control of dependencies.

In embodiments, a user may wish to maintain the system under test in the user's local computing resources, rather than uploading the system under test to the computing resources of the Director 104. Accordingly, the Director 104 may interface with a system under test remotely, including making calls to and receiving responses from the system under test remotely. The Director 104 may include a system under test connector for such data exchange with a system under test maintained and stored by the user.

The Director 104 may store the results of each simulation in the results database 116. The results of a single simulation may include, in embodiments, time-synchronized data respective of one or more aspects (e.g., all aspects) of the simulation, including the appearance, locations, velocities, and/or acceleration of dynamic aspects of the simulation, such as the ego vehicle, traffic vehicles, pedestrians, etc., as well as the locations and appearance of static aspects of the simulation, such as curbs, buildings, and other obstacles, as well as output of simulated sensors (e.g., camera images, Lidar point clouds, etc.). Such data may also be time-synchronized and recorded along with routine calls and code invoked in the system under test 118.

The Analyzer 106 may include a graphical user interface through which the user may review one or more simulations that have been performed by the Director 104. The Analyzer 106 may output, in embodiments, a four-dimensional (4D) (e.g., three spatial dimensions, plus time) render of a simulation. The Analyzer 106 may further output, in embodiments, a code trace in the user's system under test, synchronized with other data respective of the simulation, to enable the user to review the particular routines and portions of the system under test that invoked so that the user may adjust the code of the system under test as needed. The Analyzer 106 may further output raw sensor data from a simulation, which output may be synchronized to a 4D render of the simulation, in some embodiments.

In some embodiments, the Analyzer 106 may output data that the user may use as training data to improve one or more aspects of a control system or perception system. For example, the Analyzer 106 may output data respective of the position, velocity, and other aspects of traffic vehicles, as well as output from sensors and the control system's interpretation of the sensor data from a plurality of simulations as training data for training a traffic vehicle recognition algorithm.

Figure 2:
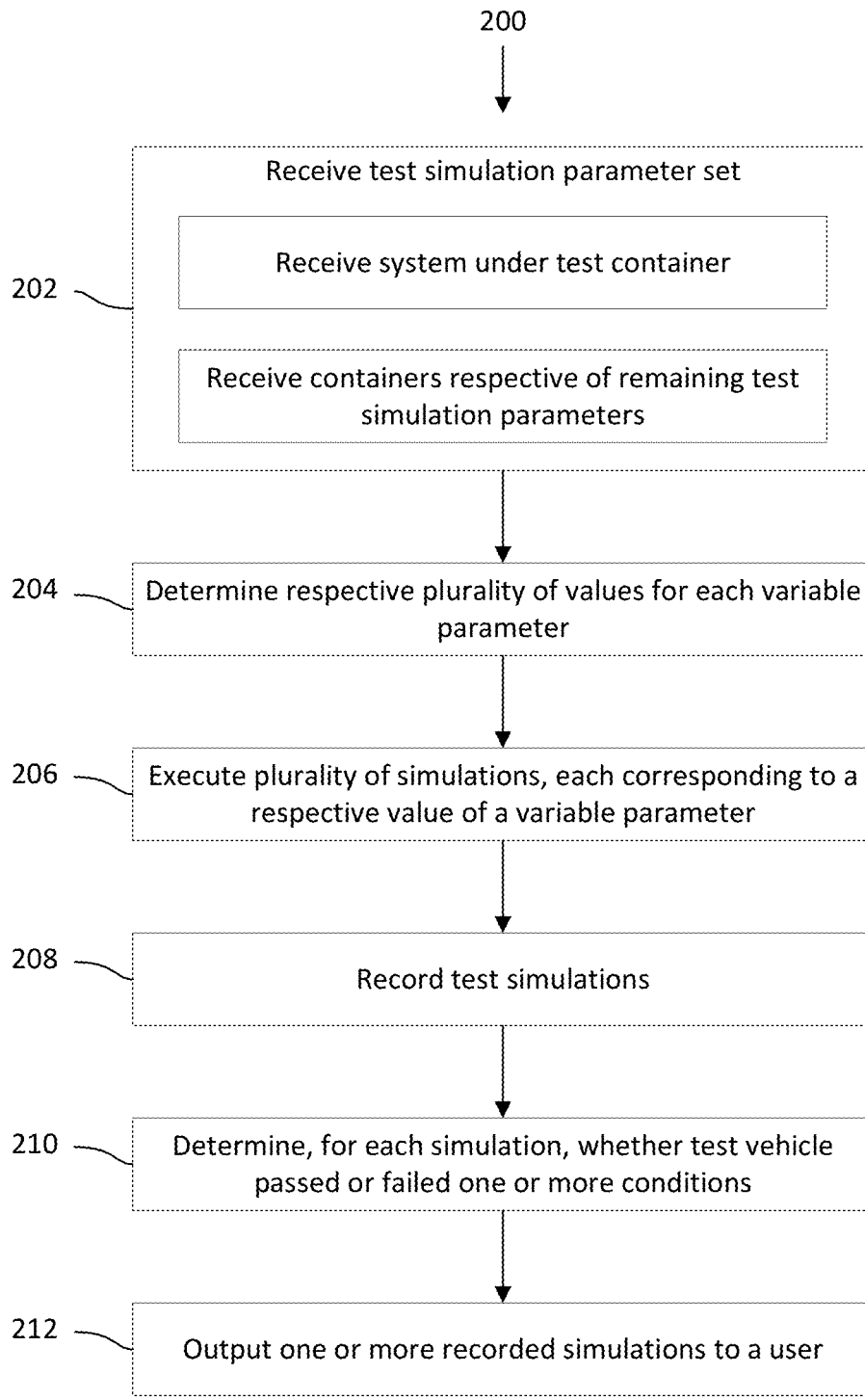
FIG. 2 is a flow chart illustrating an example method of conducting a plurality of test simulations of an autonomous vehicle and/or component thereof.

FIG. 2 is a flow chart illustrating an example method 200 of conducting a plurality of test simulations of an autonomous vehicle and/or component thereof. The method 200, or one or more aspects thereof, may be performed by or with one or more aspects of the system 100, such as the Designer 102, Director 104, and/or Analyzer 106, in some embodiments.

The method 200 and other methods of this disclosure will be described with reference to vehicles, sensors, scenes, environments, etc. It should be understood that such entities, in the context of this disclosure, are virtual representations, not physical entities.

The method 200 may include, at block 202, receiving a test simulation parameter set. The test simulation parameter set may include, e.g., one or more ego vehicles (or one or more aspects thereof), one or more scenarios, and one or more pass/fail conditions, in some embodiments. Details regarding defining an ego vehicle and defining a scenario are provided with respect to FIGS. 3-8. The test simulation parameter set may be received from a user, in an embodiment.

The test simulation parameter set may also include, for each set of parameter values, one or more pass/fail conditions. Pass-fail conditions may include, for example, contact between the ego vehicle and another object in the scenario (fail), moving over a designated path within a predetermined amount of time (pass), and the like.

Receiving a test simulation parameter set may include, at sub-block 202*a*, receiving a system under test container and, at sub-block 202*b*, receiving the remaining test simulation parameter set.

The SUT container received at sub-block 202*a* may be or may include a user-specific system, such as a control scheme for an autonomous vehicle, a sensor configuration, a sensor firmware, a vehicle body, etc. The SUT container may be proprietary to the user, in some embodiments. The SUT container may be received via user upload of the SUT by the user to a computing system executing the method 200, in some embodiments. In other embodiments, the SUT container may be received by linking remotely and making remote calls to the SUT from separate computing resources. In some embodiments, the SUT may be received as a binary file, for example.

In some embodiments, two or more SUT containers may be received at sub-block 202(*a*). For example, the user may provide two different sensors in separate containers, or a sensor and its control firmware in separate containers. For ease of description, the remainder of the method 200 will generally be described with reference to embodiments with a single SUT, but it should be understood that the method 200 may be applied to multiple SUTs, in some embodiments.

The remaining test simulation parameter set received at sub-block 202*b* may include all other aspects, other than the user SUT, required to perform one or more test simulations. In some embodiments, the remaining test simulation parameter set may be retrieved from a central repository of parameters (e.g., stored on one or more servers). Receiving remaining test simulation parameters at sub-block 202*b* may include providing a user with a plurality of options for each parameter, and receiving user selections for each parameter.

In some embodiments, receiving the test simulation parameter set may include receiving a single value for a plurality of parameters within the test simulation parameter set and an instruction to vary one or more parameters within the set over a series of test simulations. For example, a single value may be received for all parameters within the parameter set, and an instruction to vary one parameter within the parameter set may be received. The parameter to be varied may be an ego vehicle parameter, such as a location of a sensor on the ego vehicle, a sensor setting, an ego vehicle body, a setting of the control logic for the ego vehicle, an ego vehicle performance characteristic, etc., in some embodiments. In other embodiments, the parameter to be varied may be a scenario parameter, such as a traffic setting, a stoplight location or timing, a street feature, etc.

The method may further include, at block 204, determining a respective plurality of values for each variable parameter. Determining a plurality of values for a given parameter may include, for example, determining a set of values surrounding a given base value received at block 202, in some embodiments. Additionally or alternatively, determining a plurality of values for a given parameter may include determining an appropriate set of values for the parameter provided the remaining parameters in the parameter set. For example, where the variable parameter is a sensor location, the sensor location may be varied across the entire front of the ego vehicle where a single such sensor is used, whereas the sensor location may be varied across only a single side of the front of the vehicle where two such sensors are used.

In some embodiments, an aspect of a sensor type may be a value to be varied among simulation tests. For example, a sensor hardware latency, or sensor control firmware latency, may be varied over tests. In another example, an environmental error source for a sensor may be a varied value, such as dirt on a camera, a fogged/wet lens, laser penetration value through glass or other material, occluded laser or lidar beam, or other degree of obscuring material over a sensor, or GPS positional noise. An error source may additionally or alternatively include a quantity or location of stuck pixels, broken laser or lidar beam, or other hardware error within the sensor. In another example, hardware settings of a sensor may be a variable value, such as beam-widening characteristics of a laser beam. In another example, a position or arrangement-based error of a sensor may be a variable value, such as IMU misalignment angle, bias error and scale factor, or localizer position, orientation and kinematic noise. In another example, a firmware setting of the sensor may be varied, such as a radar probability of detection or false alarm rate.

The method may further include, at block 206, executing a plurality of simulations, each corresponding to a respective value of the variable parameter. Each simulation may include moving the ego vehicle through a test scenario according to the control logic of the ego vehicle. The simulated control logic, in turn, may respond to the simulated input from the one or more sensors. As will be described below, each test scenario may include a chosen ego vehicle path through a chosen roadway.

In some embodiments, executing a simulation may include creating a simulation engine container instance, which container instance includes the scenario of the simulation and remaining test simulation parameter set (received at sub-block 202b). Executing a simulation may further include creating a container instance of the SUT and the container instance of the simulation engine making calls, via API, to the SUT container instance. As will be described below with respect to FIG. 9, in some embodiments, executing a plurality of simulations may include creating a plurality of simulation engine container instances and SUT container instances, with each simulation engine container instance calling a respective SUT container instance via API.

In some embodiments, executing a plurality of simulations may include executing two or more of the simulations in parallel. Each such simulation may include, in some embodiments, a respective container instance of the simulation engine, calling a respective SUT container instance via API to execute the test simulation.

The method may further include, at block 208, recording the test simulations. A test simulation may be recorded such that the simulation may be replayed in one or more forms to a user. For example, a given test simulation may be recorded as a "video" (i.e., 4D render) in which the user views the ego vehicle moving through the test scenario. Accordingly, a test simulation may include a full three-dimensional rendering of the test environment at a plurality of time points within the scenario. A given test simulation may also be recorded through a textual listing of events during the test, such as actions taken by the ego vehicle, actions within the test scenario, etc.

The method 200 may further include, at block 210, determining, for each of the plurality of simulations, whether the ego vehicle passed or failed one or more conditions of the simulation. Block 210 may include comparing the pass/fail conditions to the test simulation to compare one or more points in time of the simulation to each pass-fail condition to determine if that pass/fail condition is met.

The method 200 may further include, at block 212, outputting one or more of the recorded simulations for a user. Outputting a recorded simulation may include, for example, displaying the recorded simulation, transmitting the recorded simulation, or other form of output.

In some embodiments, the output of the simulation may include outputting a 4D visualization (three spatial dimensions plus time) of the ego vehicle and/or other aspects of the scenario, with multiple camera options. The 4D visualization may include object and path visualization, in some embodiments. The output of the simulation may include sensor data playback synchronized with the 4D visualization, in some embodiments. The output of the simulation may include a log file display with filters and seeking, and graphs of recorded time series data with seeking, in some embodiments. The output of the simulation may include a code trace in the user's system under test, synchronized with other data respective of the simulation, in some embodiments.

Figure 3:
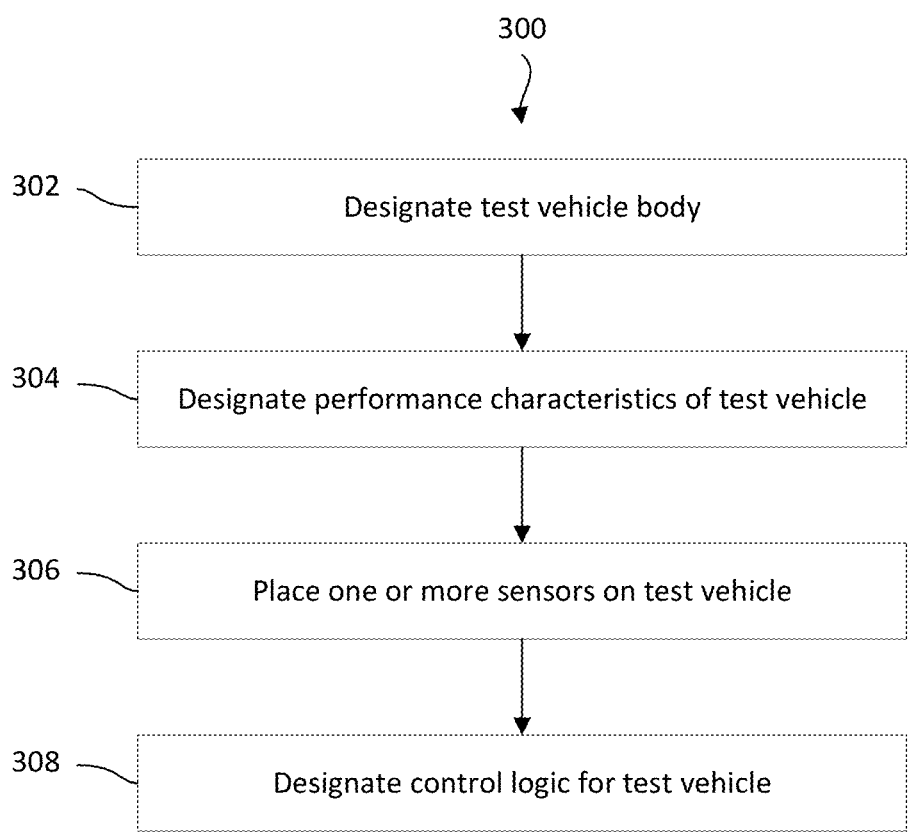
FIG. 3 is a flow chart illustrating an example method of defining a vehicle under test for a test simulation of an autonomous vehicle and/or component thereof.

FIG. 3 is a flow chart illustrating an example method 300 of defining a test vehicle for a test simulation of an autonomous vehicle and/or component thereof. The method 300, or one or more aspects thereof, may be performed by or with the Designer 102, in some embodiments. The vehicle under test may be referred to herein as the "ego" vehicle, as noted above.

The method 300 may include, at block 302, designating a test vehicle body. Designating a test vehicle body may include receiving a user selection of a test vehicle body, in some embodiments. For example, a user may select a commercially-available vehicle body. In other embodiments, designating a test vehicle body may include receiving a user-designed vehicle body, or providing a randomly-generated vehicle body from within a set of boundary conditions.

The method 300 may further include, at block 304, designating performance characteristics of the test vehicle. Performance characteristics may include, for example, acceleration along one or more vectors, turning radius, braking power or braking deceleration rate in one or more weather conditions, and the like. For example, a user may select a commercially-available vehicle (i.e., the performance characteristics of that vehicle). In other embodiments, designating performance characteristics of a test vehicle may include receiving user-specified performance characteristics, or providing randomly-generated performance characteristics from within a set of boundary conditions.

The method 300 may further include, at block 306, placing one or more sensors on the designated test vehicle. Placing one or more sensors may include receiving user selections of one or more sensors and/or user designations of locations on the test vehicle for the sensors. Such sensors may include, for example, radar, laser, lidar, camera, GPS, IMU, localizer, and/or other sensors useful for detecting the environment and/or objects around an autonomous vehicle and/or a position of the ego vehicle.

Figure 4:
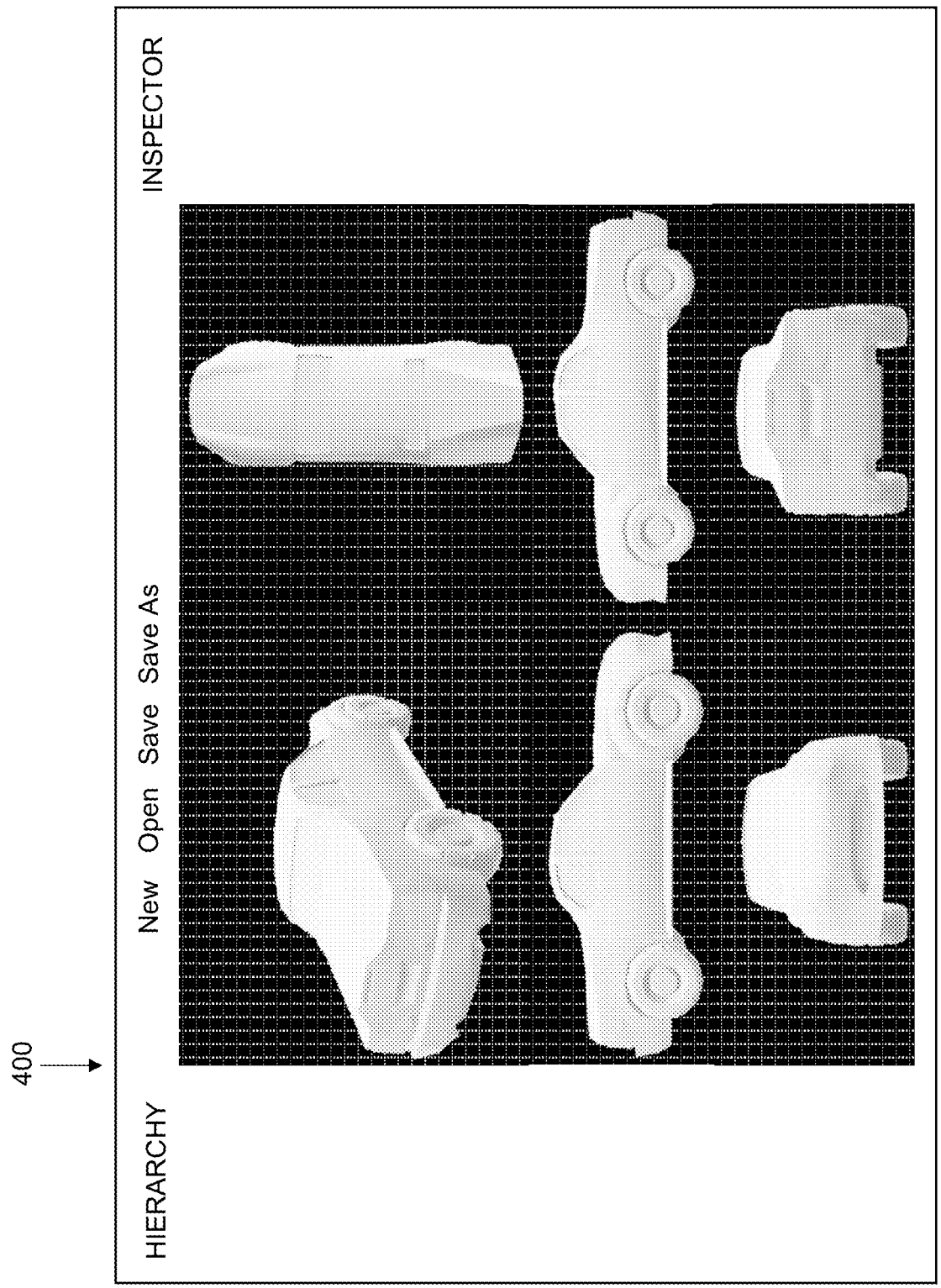
FIG. 4 is an example interface that may find use with the method of FIG. 2.

FIG. 4 is an example interface 400 for placing one or more sensors on the vehicle at block 306 of the method 300. The interface 400 may include a plurality of different views of the ego vehicle. A user may select a view, and a location on the ego vehicle within that view, and select a type of sensor to place in the location. In some embodiments, the user may select a specific sensor (e.g., a specific commercially-available model, or the user's own sensor to be tested, etc.). The user may select the orientation of each placed sensor. The user may place as many sensors on the ego vehicle as desired.

Referring again to FIG. 3, the method 300 may further include, at block 308, designating a control logic for the test vehicle. Designating a control logic may include receiving a user selection of a known or commercially-available control logic, in some embodiments. In other embodiments, designating a control logic may include receiving a user-proprietary control logic, or a user-proprietary portion of a control logic. In some embodiments, designating a control logic may include creating a randomized control logic (or one or more aspects thereof) within a set of safe boundaries. In some embodiments, designating a control logic for the vehicle may include providing a user with a list of potential ego vehicle behaviors, and allowing the user to select from those behaviors (e.g., follow distance, maximum speed).

Figure 5:
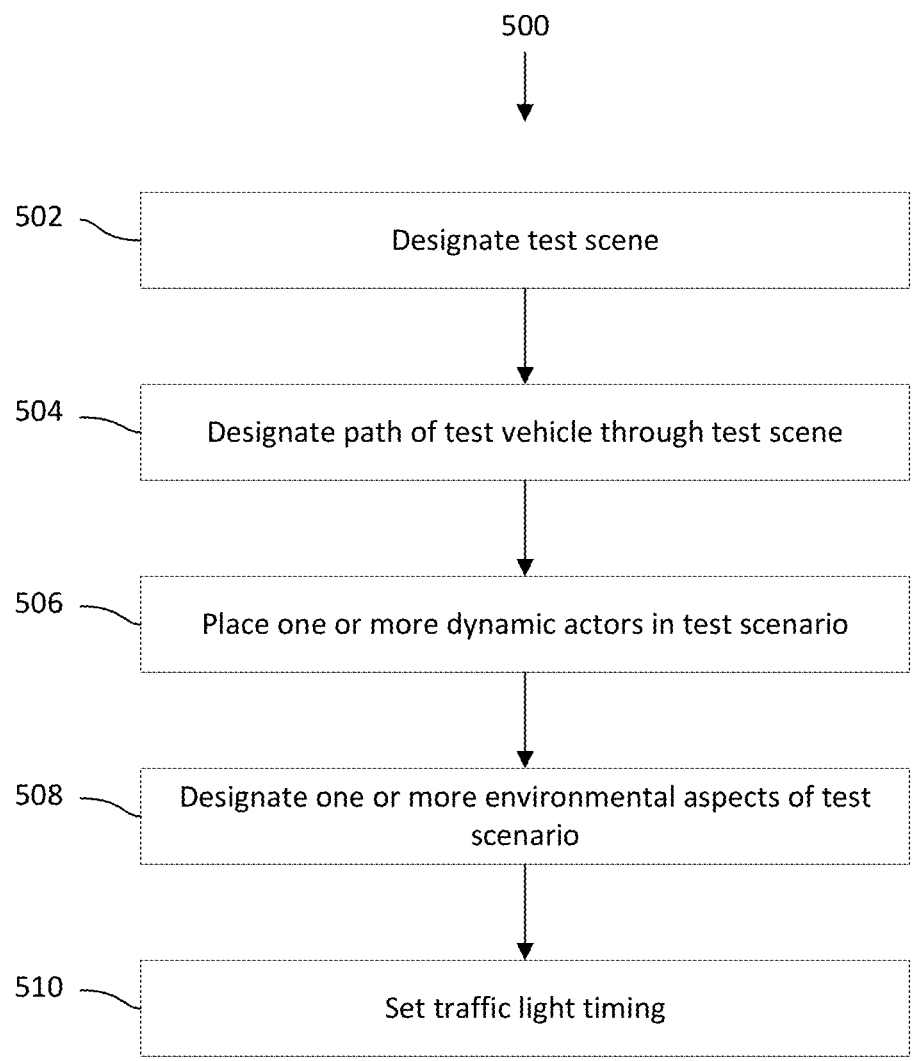
FIG. 5 is a flow chart illustrating an example method of defining a scenario for a test simulation of an autonomous vehicle and/or component thereof.

FIG. 5 is a flow chart illustrating an example method 500 of defining a scenario for a test simulation of an autonomous vehicle and/or component thereof. The method 500, or one or more portions thereof, may be performed by or with the Designer 102, in some embodiments.

The method 500 may include, at block 502, designating a test scene (which may also be referred to herein as a scene). Designating the test scene may include, for example, creating or selecting a network of one or more roads, sidewalks, parking spaces, and other pathways for one or more vehicles and pedestrians. Many different scene types may find use as part of the present disclosure. Certain example scenes will be described below with respect to FIGS. 6, 7, and 8.

Figure 6:
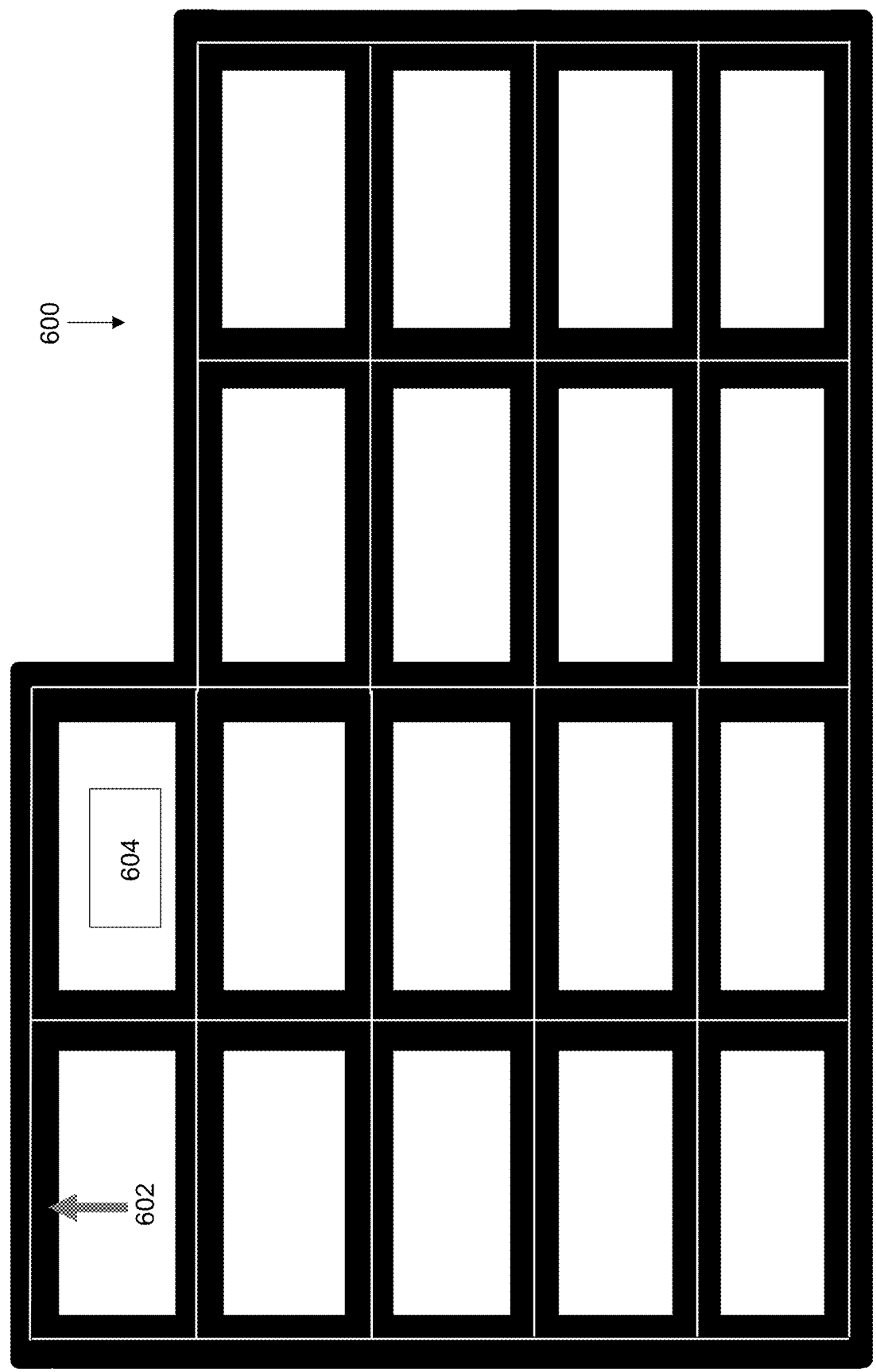
FIG. 6 is an example simulated urban roadway that may find use with the method of FIG. 5.

FIG. 6 is an example simulated urban roadway scene 600 that may find use with the method 500 of FIG. 5. The example simulated urban roadway scene 600 may include a network of streets 602 arranged in a grid pattern, for example. The network of streets 602 may be a closed set of streets, in some embodiments, as illustrated in FIG. 6. Each of the streets may include one or more lanes in one or more directions, in the simulated urban roadway scene 600 of FIG. 6 and the other simulated scenes of this disclosure. One or more intersections of streets may include traffic lights, traffic signs (e.g., stop signs, yield signs, etc.), or other traffic control media, in the simulated urban roadway scene 600 of FIG. 6 and the other simulated scenes of this disclosure.

The example simulated urban roadway scene 600 may further include one or more buildings 604 between the streets. The buildings may be uniform throughout the simulated scene, in some embodiments. In other embodiments, the buildings may be variable throughout the environment. Each of the buildings may include one or more simulated materials that may have a simulated reflectivity to one or more types of sensors that may be used by an ego vehicle (e.g., radar, laser, infrared, different colors of visible light).

Figure 7:
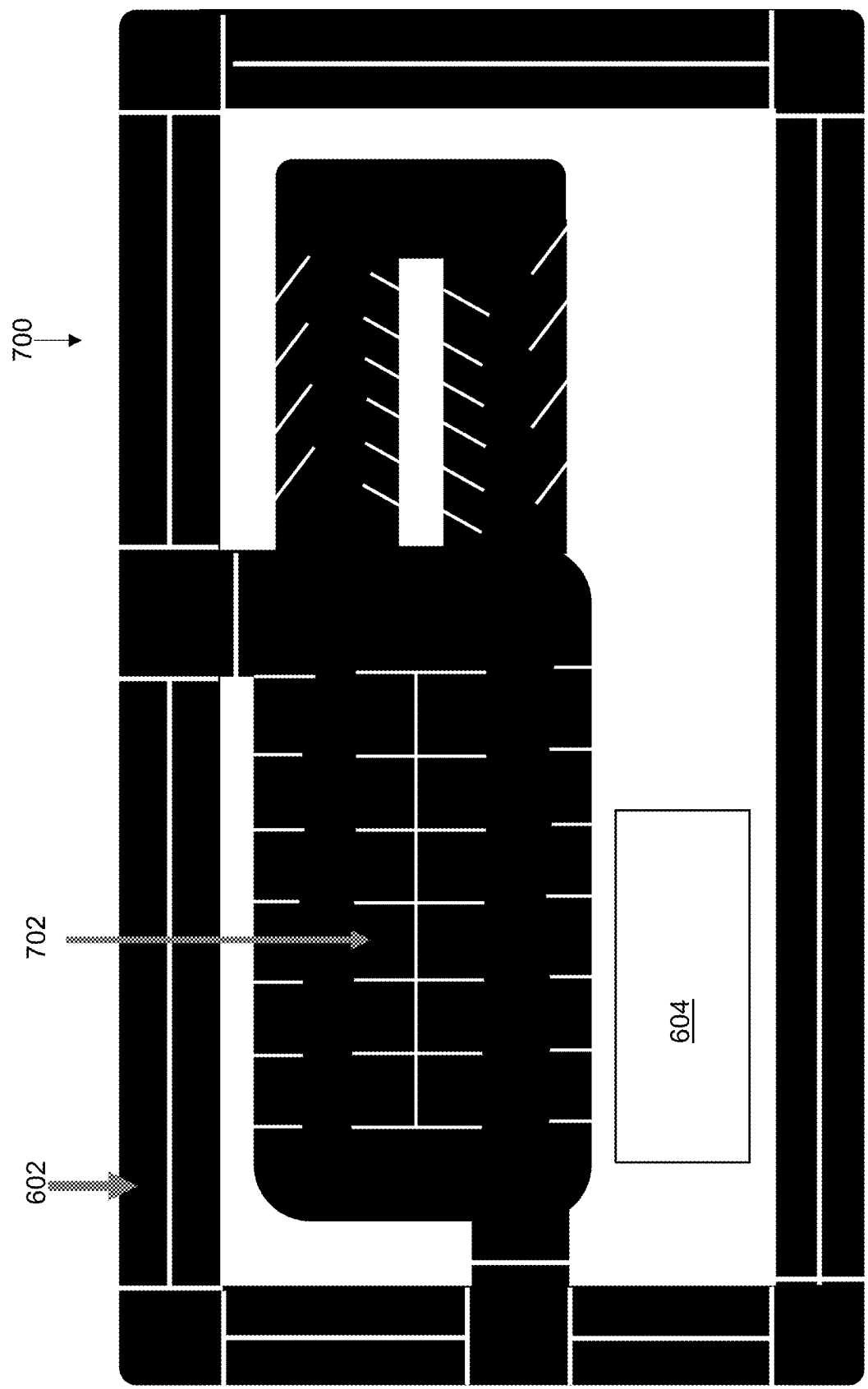
FIG. 7 is an example simulated parking lot that may find use with the method of FIG. 5.

FIG. 7 is an example simulated parking lot scene 700 that may find use as a test scene with the method 500 of FIG. 5. The simulated parking lot scene 700 may include one or more rows of parking spots 702, which spots may be perpendicular or otherwise angled to a driving lane. The parking lot scene may further include one or more streets 602 around the parking lot and one or more buildings 604. Like the urban roadway scene 600, the parking lot scene 700 may be a closed environment.

Figure 8:
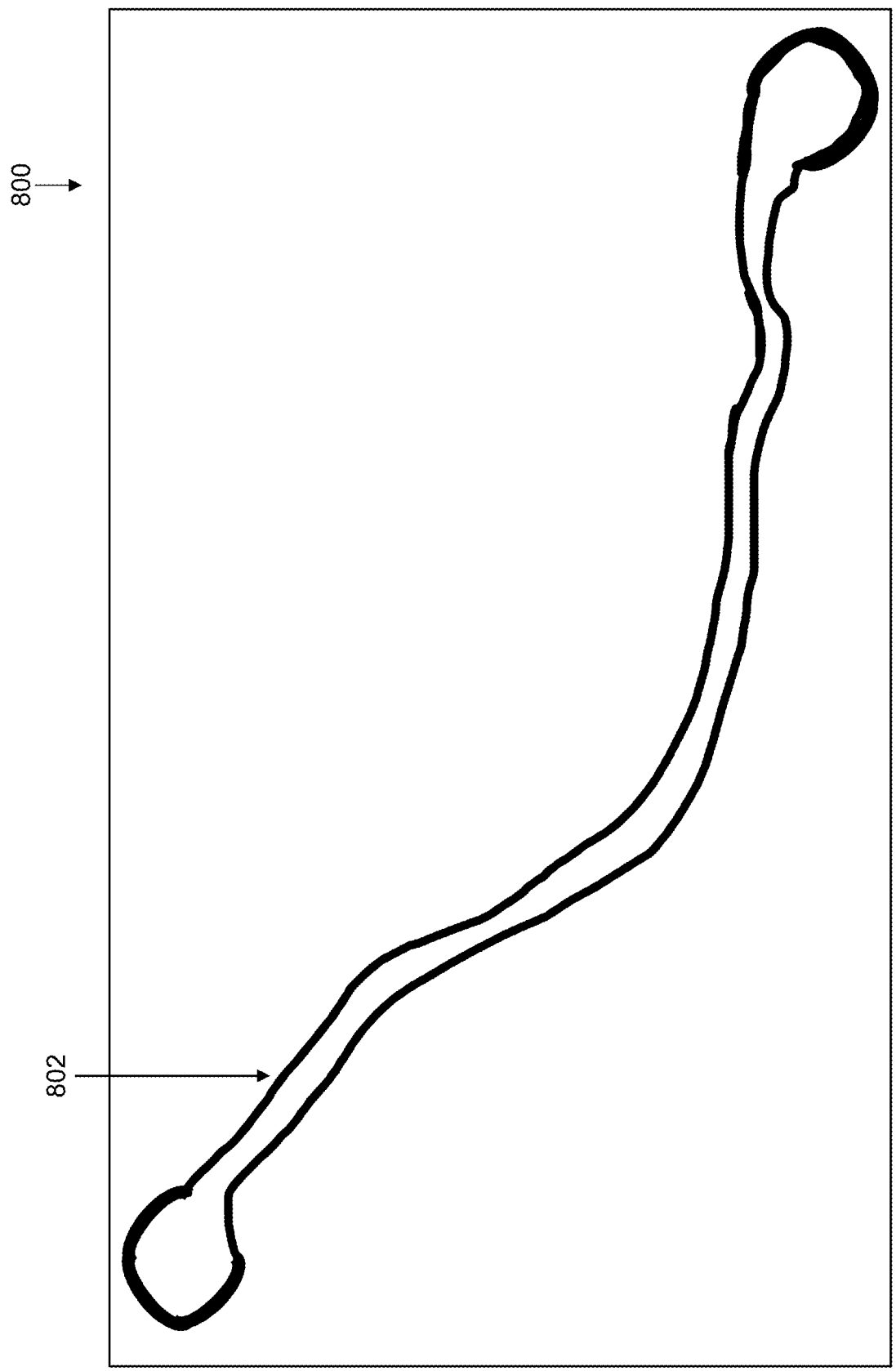
FIG. 8 is an example simulated highway that may find use with the method of FIG. 4.

FIG. 8 is an example simulated highway scene 800 that may find use as a test roadway scene with the method 500 of FIG. 5. The highway scene 800 may include a highway scene 802 of one or more lanes, as well as one or more on-ramps and/or off-ramps. The highway scene 802 may lack traffic lights, in some embodiments. The highway scene 802 may be a closed environment, in some embodiments.

Referring again to FIG. 5, the method 500 may further include, at block 504, designating a path of the ego vehicle through the test scene. Designating a path of the ego vehicle may include, for example, receiving a user-designated path through the test scene. In other embodiments, designating a path of the ego vehicle may include randomly creating a path through the test scene (e.g., after receiving a user-selected starting point and/or ending point).

The method 500 may further include, at block 506, placing one or more dynamic actors and setting behaviors of the one or more dynamic actors in the test scenario. Dynamic actors may include, for example, traffic vehicles (e.g., cars, trucks, buses, etc.), bicyclists, pedestrians, and other third-party actors relative to the ego vehicle. Dynamic actors may be placed at random based on a random density, may be placed at random responsive to one or more user settings (e.g., density, speed, aggression, etc.), or may be placed responsive to specific user selections of placement. Movement of dynamic actors may also be set by and receive from a user—e.g., whether a traffic vehicle is moving or parked, whether a pedestrian is walking or standing, etc.

The method 500 may further include, at block 508, designating one or more environmental aspects of the scenario. Environmental aspects may include, for example, precipitation type and quantity or rate, time of day, time of year, sun or moon position, cloud cover, temperature, street pavement type (e.g., concrete, brick, dirt, etc.) and features (e.g., tar snakes, potholes, speed bumps, etc.), road marking quality, and the like. Environmental aspects may be designated via one or more selections received from a user, or may be designated at random from within a set of constraints.

The method 500 may further include, at block 510, setting traffic light timing within the test scene. Traffic light timing may be set at random within a set of constraints, or may be set responsive to specific user selections. In some embodiments, setting traffic light timing may include setting an initial state of each traffic light in the scene (e.g., responsive to user input, or automatically).

Figure 9:
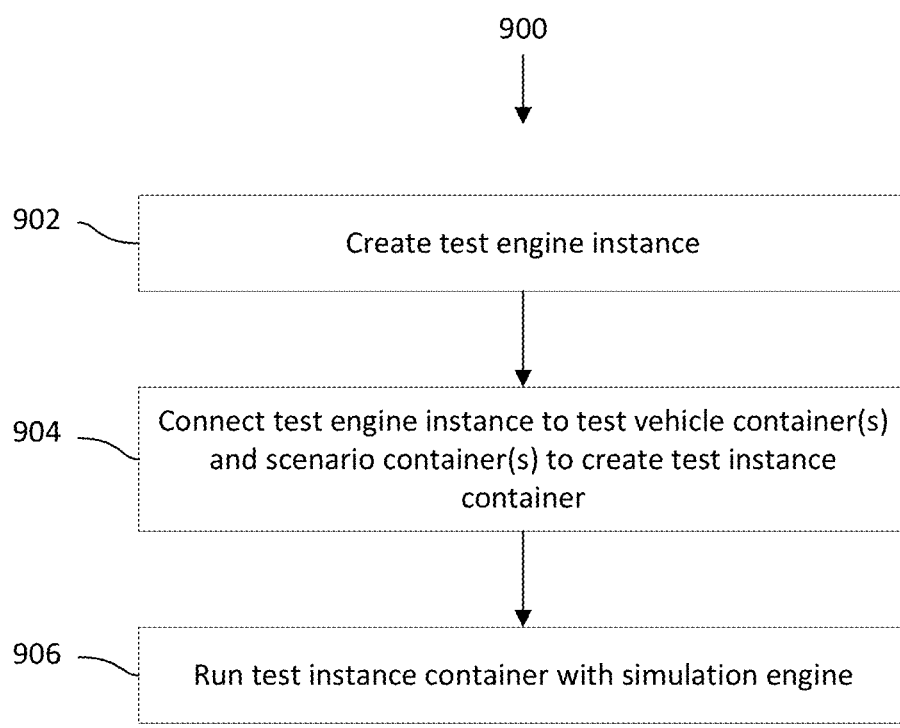
FIG. 9 is a flow chart illustrating an example method of executing a test simulation of an autonomous vehicle and/or component thereof.

FIG. 9 is a flow chart illustrating an example method 900 of executing a test simulation of an autonomous vehicle and/or component thereof. The method 900, or one or more aspects thereof, may be performed by the Director 104, in some embodiments.

The method 900 may include, at block 902, creating a simulation engine container instance. The simulation engine container instance may include the physics and rules necessary for creating the test scenario, filling the test scenario with one or more ego vehicles and one or more other dynamic actors, and operating the ego vehicle(s) within the test scenario, including simulating the one or more sensors of the ego vehicle(s) and simulating the control logic of the ego vehicle(s) responsive to input from those sensors. The simulation engine container instance may further include aspects of the ego vehicle other than the user's SUT(s). The simulation engine container instance may further include a respective value of a variable parameter that is to be parameterized across simulations.

In some embodiments, creating a simulation engine container instance may include compiling the simulation engine API into the programming language of a system under test.

The method 900 may further include, at block 904, creating an instance of each user system under test container.

Accordingly, where numerous simulations are performed, each simulation may include its own SUT container instance.

The method 900 may further include, at block 906, connecting the simulation engine container instance to the one or more SUT containers. The simulation engine container instance may be connected to the SUT container(s) via a software API associated with the simulation engine. The simulation engine container instance may be specific to a set of test parameter values, in some embodiments. In addition, the SUT container(s) may be specific to a set of test parameter values, in some embodiments. Accordingly, to test different sets of parameter values (e.g., as part of a parameterization over a given aspect of the test, such as a specific value of a specific parameter), separate simulation engine container instances may be created and/or separate SUT containers may be created.

The method 900 may further include, at block 908, running the simulation according to the linked simulation engine container instance and SUT instance, which may include creating the scene, simulating the environment, simulating the third party dynamic actors, simulating the operation of one or more sensors, and simulating the behavior of the ego vehicle (e.g., along a selected path) according to its control scheme as informed by the output of the one or more sensors.

Container-based simulation according to method 900 may provide many advantages. First, it may enable efficient use of computing resources for running multiple simulations in parallel, and may scale easily from a single simulation to thousands in parallel, provided sufficient parallel resources. Second, it may enable the system under test to be run in its native (or close to its native) environment, because the API may be compiled into the computing language of the SUT. Third, it supports modularity by deploying a single simulation as a set of containers connected via network APIs. As a result, a complete system under test can be split into multiple components, each running within its own container. Fourth, it enables multiple systems under test to be cooperatively and securely tested in a single simulation or set of simulations without exposing the codebases of the systems under test to one another, which may enable separate parties to jointly develop control systems (e.g., with one party supplying a sensor, and the other supplying control firmware for the sensor, without requiring codebase sharing).

Figure 10:
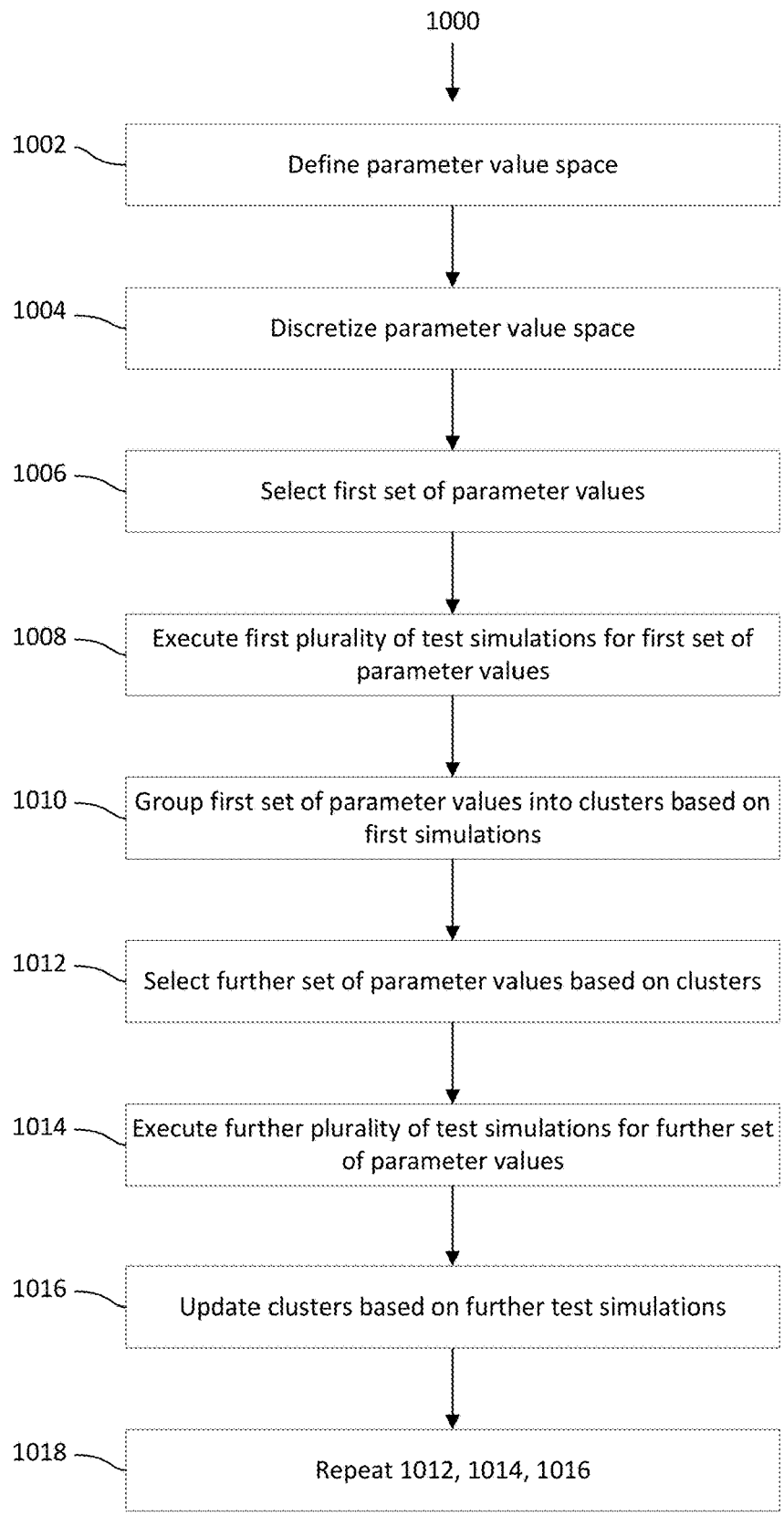
FIG. 10 is a flow chart illustrating an example method of parameterizing over one or more aspects of a test simulation in a series of test simulations of an autonomous vehicle and/or component thereof.

FIG. 10 is a flow chart illustrating an example method 1000 of parameterizing over one or more aspects of a test simulation in a series of test simulations of an autonomous vehicle and/or component thereof. The method 1000 may find use with the methods 200, 900 of FIGS. 2 and 9. Specifically, the method 1000 of FIG. 10 may be applied to determine different values of a given parameter (e.g., in method 200), which different values may be applied in separate simulations that may be executed according to method 900, in some embodiments.

The method 1000 may include, at block 1002, defining a parameter value space. The parameter value space may be defined by the user, in some embodiments, or may be defined automatically, in some embodiments. For example, where the parameter is a sensor location on the front bumper of the vehicle, the parameter value space may include each possible location on the front bumper of an ego vehicle body selected for test. In another example, where the parameter is a follow distance setting in a vehicle control logic, the parameter value space may be from zero to a selected maximum (e.g., 100 yards), or a narrower range selected by the user.

The method 1000 may further include, at block 1004, discretizing the parameter value space, which may include dividing the parameter space into a set of spaced discrete values. In some embodiments, the discretized values may be evenly spaced. In other embodiments, the discretized values may be unevenly spaced (e.g., with higher density around a center of the parameter space, or around one or more regions expected to have more successful values).

The method 1000 may further include, at block 1006, selecting a first, initial set of parameter values. The first set of parameter values may be a subset of the total set of discretized parameter values. The initial set of parameter values may cover the entire parameter space, in some embodiments. In other embodiments, the initial set of parameters may cover only a portion of the parameter space. In some embodiments, the first set of parameter values may be evenly sampled across the discretized parameter space. In other embodiments, the first set of parameter values may be randomly sampled from the discretized parameter space.

The method 1000 may further include, at block 1008, executing a plurality of respective simulation tests for each of the parameter values in the first set. For example, each simulation test may be executed according to method 900.

The method 1000 may further include, at block 1010, grouping values within the first parameter value set into clusters according to respective outcomes of the plurality of simulation tests run at block 1008. For example, considering an example in which four pass-fail conditions are provided (conditions A, B, C, and D), parameter values in which corresponding simulations passed all pass/fail conditions may be grouped in a first cluster, parameter values in which corresponding simulations passed conditions A, B, and C but failed condition D may be grouped in a second cluster, parameter values in which corresponding simulations passed conditions B, C, and D, but failed condition A may be grouped in a third cluster, and so on. In other embodiments, other clustering criteria may be applied.

The method 1000 may further include, at block 1012, selecting a further set of parameter values based on the clusters. In some embodiments, selecting a further set of parameter values may include one or more of the following:

If all tested parameter values are in the same cluster, randomly sample the discretized parameter value space;

If two or more clusters exist (i.e., differing pass/fail results within parameter value space), select parameter values in the regions of the parameter space between clusters (e.g., including and overlapping with the edges of the clusters, or excluding and not overlapping with the edges of the clusters). Parameter values in the regions of the parameter space between clusters may be selected according to one or more of the following:

Randomly sample the regions of the parameter space between the passed and failed clusters.

Use gradient descent to follow a path in the parameter space between the passed and failed clusters.

The method 1000 may further include, at block 1014, executing a plurality of respective simulation tests for each of the parameter values in the further set. For example, each simulation test may be executed according to method 900.

The method 1000 may further include, at block 1016, updating the clusters created in block 1010 according to the results of the additional simulation tests executed at block 1014.

The method may further include, at block 1018, repeating blocks 1012, 1014, 1016 until a distance between successive parameter sets falls below a predetermined threshold or until a predetermined maximum number of simulations has been executed. In some embodiments, calculating a distance between parameter sets may include calculating a Euclidean distance according to the sum of the squared normalized distances between like parameters in each set. For example, if a parameter set contains three parameters A, B, and C, the total distance ($D_T$) between two parameter sets (designated by subscript 1 and 2) may be defined according to equation (1) below:

$$D_T = (D(A_1, A_2))^2 + (D(B_1, B_2))^2 + (D(C_1, C_2))^2 \qquad \text{(Eq. 1)}$$

The distance measurement (D) of equation (1) applicable to a specific parameter (A, B, or C) may return a normalized distance. The specific form of a distance measurement applicable to a specific parameter may depend on the parameter type.

Variable value parameterization according to the present disclosure may provide many advantages. First, parameterization according to the present disclosure may enable determination of an ideal value of a parameter, particularly if the parameterization is respective of an aspect of the SUT. Second, parameterization according to the present disclosure may enabled determination of conditions and circumstances in which the SUT does and does not function, particularly where the parameterization is respective of something outside of the SUT. For example, the respective outputs of the parameterized simulations may inform the user specifically of conditions in which the SUT does and does not lead to desired results with as much specificity as possible (e.g., enable the user to determine the specific degree of sunlight at which a sensor does not function as desired, or a specific combination of traffic movements in which a vehicle control strategy does not function properly, etc.)

Referring to FIGS. 1, 2, 9, and 10, in operation, a user may enter the desired aspects of a set of simulation tests, as described with respect to FIG. 2 (and, more specifically, with respect to FIGS. 3 and 5). For example, the user may provide an SUT and may select the remaining aspects of the simulation tests from options provided by the Designer 102. For example, the user's SUT may be a sensor (e.g., with its own specific and proprietary physical and hardware characteristics) and/or sensor control firmware, and the user may select the other aspects of the ego vehicle from provided options, as well as the scenario(s) for test. In another example, the user's SUT may be a control logic for an autonomous vehicle, and the user may select the ego vehicle and scenario(s) for test from provided options. The user's SUT and the system-provided aspects may be in respective containers. Accordingly, the Designer 102 may be configured to provide any or all aspects of a simulation test for user selection. The user may further select one or more parameters values for parameterization according to method 1000. The Designer 102 and Director 104 may implement methods 200, 900, and 1000 in conjunction to select appropriate parameter values and execute a series of simulation tests for those parameter values, each of which simulation tests may include its own container instance for each user SUT and its own container instance of the simulation engine.

Figure 11:
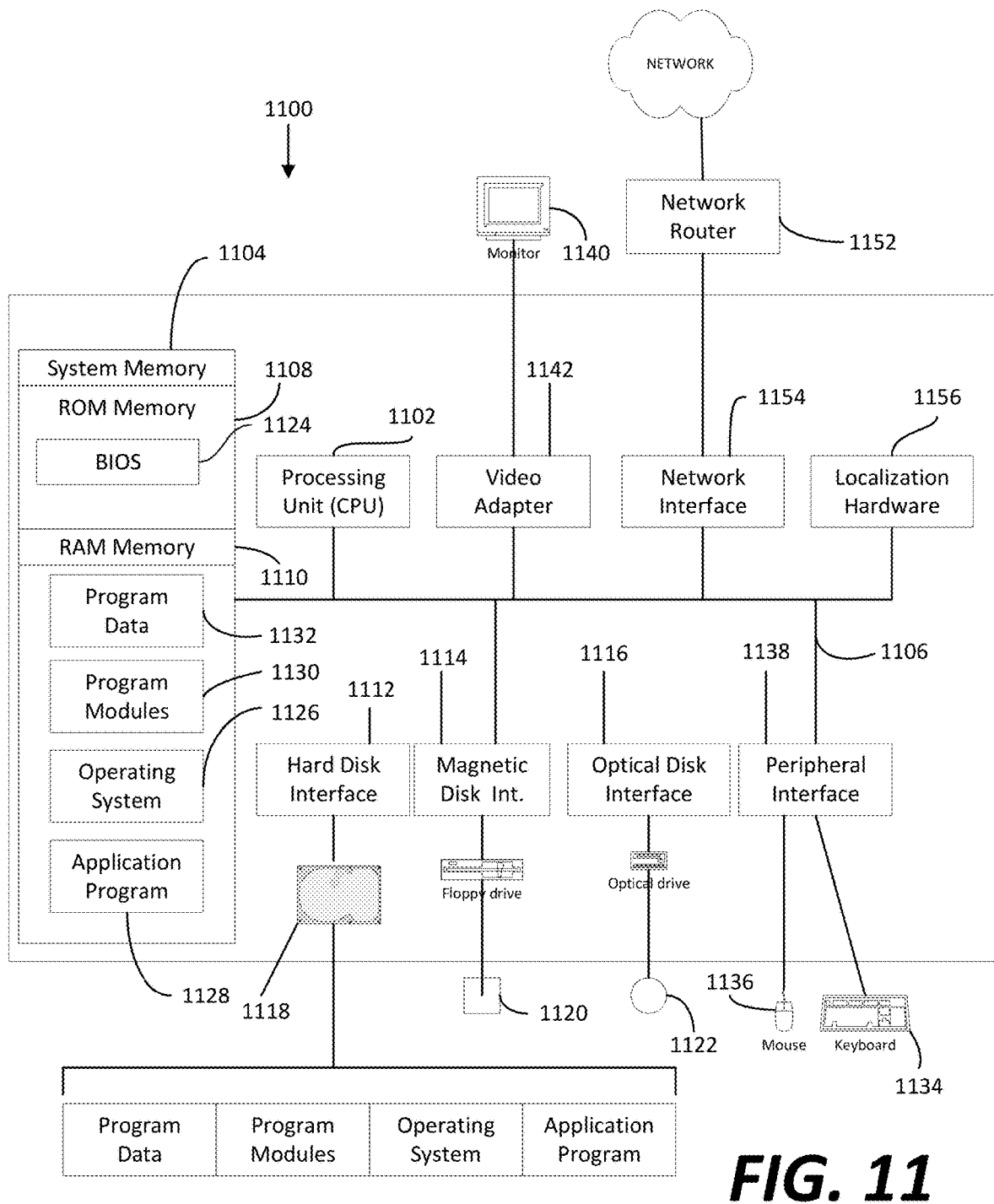
FIG. 11 is a diagrammatic view of an example embodiment of a user computing environment

FIG. 11 is a diagrammatic view of an example embodiment of a user computing environment that includes a general purpose computing system environment 1100, such as a desktop computer, laptop, smartphone, tablet, or any other such device having the ability to execute instructions, such as those stored within a non-transient, computer-readable medium. Furthermore, while described and illustrated in the context of a single computing system 100, those skilled in the art will also appreciate that the various tasks described hereinafter may be practiced in a distributed environment having multiple computing systems 200 linked via a local or wide-area network in which the executable instructions may be associated with and/or executed by one or more of multiple computing systems 1100.

In its most basic configuration, computing system environment 1100 typically includes at least one processing unit 1102 and at least one memory 1104, which may be linked via a bus 1106. Depending on the exact configuration and type of computing system environment, memory 1104 may be volatile (such as RAM 1110), non-volatile (such as ROM 1108, flash memory, etc.) or some combination of the two. Computing system environment 1100 may have additional features and/or functionality. For example, computing system environment 1100 may also include additional storage (removable and/or non-removable) including, but not limited to, magnetic or optical disks, tape drives and/or flash drives. Such additional memory devices may be made accessible to the computing system environment 1100 by means of, for example, a hard disk drive interface 1112, a magnetic disk drive interface 1114, and/or an optical disk drive interface 1116. As will be understood, these devices, which would be linked to the system bus 1106, respectively, allow for reading from and writing to a hard disk 1118, reading from or writing to a removable magnetic disk 1120, and/or for reading from or writing to a removable optical disk 1122, such as a CD/DVD ROM or other optical media. The drive interfaces and their associated computer-readable media allow for the nonvolatile storage of computer readable instructions, data structures, program modules and other data for the computing system environment 1100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1100.

A number of program modules may be stored in one or more of the memory/media devices. For example, a basic input/output system (BIOS) 1124, containing the basic routines that help to transfer information between elements within the computing system environment 1100, such as during start-up, may be stored in ROM 1108. Similarly, RAM 1110, hard drive 1118, and/or peripheral memory devices may be used to store computer executable instructions comprising an operating system 1126, one or more applications programs 1128 (such as the Designer 102, Director 104, or Analyzer 106, or other program to perform one or more of the functions, methods, operations, etc. of this disclosure), other program modules 1130, and/or program data 1122. Still further, computer-executable instructions may be downloaded to the computing environment 1100 as needed, for example, via a network connection.

An end-user, e.g., a proprietor of an autonomous vehicle control system or other system under test and/or aspects thereof, may enter commands and information into the computing system environment 1100 through input devices such as a keyboard 1134 and/or a pointing device 1136. While not illustrated, other input devices may include a microphone, a joystick, a game pad, a scanner, etc. These and other input devices would typically be connected to the processing unit 1102 by means of a peripheral interface 1138 which, in turn, would be coupled to bus 1106. Input devices may be directly or indirectly connected to processor 1102 via interfaces such as, for example, a parallel port, game port, firewire, or a universal serial bus (USB). To view information from the computing system environment 1100, a monitor 1140 or other type of display device may also be connected to bus 1106 via an interface, such as via video adapter 1132. In addition to the monitor 1140, the computing system environment 1100 may also include other peripheral output devices, not shown, such as speakers and printers.

The computing system environment 1100 may also utilize logical connections to one or more computing system environments. Communications between the computing system environment 1100 and the remote computing system environment may be exchanged via a further processing device, such a network router 1152, that is responsible for network routing. Communications with the network router 1152 may be performed via a network interface component 1154. Thus, within such a networked environment, e.g., the Internet, World Wide Web, LAN, or other like type of wired or wireless network, it will be appreciated that program modules depicted relative to the computing system environment 1100, or portions thereof, may be stored in the memory storage device(s) of the computing system environment 1100.

The computing system environment 1100 may also include localization hardware 1186 for determining a location of the computing system environment 1100. In embodiments, the localization hardware 1156 may include, for example only, a GPS antenna, an RFID chip or reader, a WiFi antenna, or other computing hardware that may be used to capture or transmit signals that may be used to determine the location of the computing system environment 1100.

The computing environment 1100, or portions thereof, may comprise one or more components of the system 100 of FIG. 1, in embodiments, such as the computing resources of a user or of a cloud server system executing one or more of the functional modules of the system 100.

In a first aspect of this disclosure, a method for performing an electronic simulation of an autonomous vehicle is provided. The method includes: receiving a system under test from a user, the system under test comprising a component of an autonomous vehicle; receiving a pass/fail condition from the user; receiving an indication of a variable parameter from the user; determining a plurality of values of the variable parameter; creating a respective system under test container instance for each of the plurality of values; creating a respective container instance of a simulation engine for each of the plurality of values, each simulation engine container instance linked to a respective system under test container; performing, with the simulation container instances, a respective simulation for each of the plurality of values; determining, for each of the respective simulations, whether the simulation passed or failed the pass/fail condition; and outputting, to the user, a result of the respective simulations.

In an embodiment of the first aspect, the system under test is a sensor, and each simulation engine container instance comprises a body of the autonomous vehicle, one or more performance characteristics of the autonomous vehicle, and a scene, the scene comprising a roadway.

In an embodiment of the first aspect, the variable parameter comprises: a latency of the sensor; an environmental error respective of the sensor; a hardware error respective of the sensor; a hardware setting of the sensor; a position-based or arrangement-based error of the sensor; or a firmware setting of the sensor.

In an embodiment of the first aspect, determining a plurality of values of the variable parameter comprises: determining a value space for the variable parameter; and selecting the plurality of values randomly from within the value space.

In an embodiment of the first aspect, the plurality of values is a first plurality of values, the simulation engine container instances are a first plurality of simulation engine container instances, and the simulations are a first plurality of simulations, and the method further comprises: grouping the first plurality of values into two or more clusters according to whether each of the first plurality of simulations passed or failed the pass/fail condition; selecting a second plurality of values according to the clusters; creating a second plurality of simulation engine container instances comprising a respective container instance of the simulation engine for each of the second plurality of values, each container instance in the second plurality of container instances linked to a respective system under test container; performing, with the second plurality of simulation container instances, a second plurality of simulations comprising a respective simulation for each of the second plurality of values; determining, for each of the second plurality of respective simulations, whether the simulation passed or failed the pass/fail condition; and outputting, to the user, a result of the second plurality of respective simulations.

In an embodiment of the first aspect, the method further comprises: designating a body of the autonomous vehicle; designating performance characteristics of the autonomous vehicle; designating a sensor arrangement of the autonomous vehicle; and designating a control logic for the autonomous vehicle; wherein each system under test container instance and the associated simulation engine container instance collectively comprise the body, the performance characteristics, the sensor arrangement, and the control logic.

In an embodiment of the first aspect, the method further comprises: designating a roadway; determining one or more environmental conditions; and determining one or more traffic vehicles; wherein each simulation engine container instance comprises the roadway, the one or more environmental conditions, and the one or more traffic vehicles.

In an embodiment of the first aspect, outputting, to the user, a result of the respective simulations comprises outputting one or more of: a 4D visualization of the autonomous vehicle in at least one of the simulations; sensor data playback in at least one of the simulations; a log file display of one or more of the simulations; a code trace in the system under test in at least one of the simulations; or whether each of the simulations passed or failed the pass/fail condition.

In a second aspect of the present disclosure, a system for performing an electronic simulation of an autonomous vehicle is provided. The system comprises: a processor; and a non-volatile computer-readable memory storing instructions that, when executed by the processor, cause the processor to: receive a system under test from a user, the system under test comprising a component of an autonomous vehicle; receive a pass/fail condition from the user; receive an indication of a variable parameter from the user; determine a plurality of values of the variable parameter; create a respective system under test container instance for each of the plurality of values; create a respective container instance of a simulation engine for each of the plurality of values, each simulation engine container instance linked to a respective system under test container; perform, with the simulation container instances, a respective simulation for each of the plurality of values; determine, for each of the respective simulations, whether the simulation passed or failed the pass/fail condition; and output, to the user, a result of the respective simulations.

In an embodiment of the second aspect, the system under test is a sensor, and each simulation engine container instance comprises a body of the autonomous vehicle, one or more performance characteristics of the autonomous vehicle, and a scene, the scene comprising a roadway.

In an embodiment of the second aspect, the variable parameter comprises: a latency of the sensor; an environmental error respective of the sensor; a hardware error respective of the sensor; a hardware setting of the sensor; a position-based or arrangement-based error of the sensor; or a firmware setting of the sensor.

In an embodiment of the second aspect, determining a plurality of values of the variable parameter comprises: determining a value space for the variable parameter; and selecting the plurality of values randomly from within the value space.

In an embodiment of the second aspect, the plurality of values is a first plurality of values, the simulation engine container instances are a first plurality of simulation engine container instances, and the simulations are a first plurality of simulations, and the memory stores further instructions that, when executed by the processor, cause the processor to: group the first plurality of values into two or more clusters according to whether each of the first plurality of simulations passed or failed the pass/fail condition; select a second plurality of values according to the clusters; create a second plurality of simulation engine container instances comprising a respective container instance of the simulation engine for each of the second plurality of values, each container instance in the second plurality of container instances linked to a respective system under test container; perform, with the second plurality of simulation container instances, a second plurality of simulations comprising a respective simulation for each of the second plurality of values; determine, for each of the second plurality of respective simulations, whether the simulation passed or failed the pass/fail condition; and output, to the user, a result of the second plurality of respective simulations.

In an embodiment of the second aspect, the memory stores further instructions that, when executed by the processor, cause the processor to: designate a body of the autonomous vehicle; designate performance characteristics of the autonomous vehicle; designate a sensor arrangement of the autonomous vehicle; and designate a control logic for the autonomous vehicle; wherein each system under test container instance and the associated simulation engine container instance collectively comprise the body, the performance characteristics, the sensor arrangement, and the control logic.

In an embodiment of the second aspect, the memory stores further instructions that, when executed by the processor, cause the processor to: designate a roadway; determine one or more environmental conditions; and determine one or more traffic vehicles; wherein each simulation engine container instance comprises the roadway, the one or more environmental conditions, and the one or more traffic vehicles.

In an embodiment of the second aspect, outputting, to the user, a result of the respective simulations comprises outputting one or more of: a 4D visualization of the autonomous vehicle in at least one of the simulations; sensor data playback in at least one of the simulations; a log file display of one or more of the simulations; a code trace in the system under test in at least one of the simulations; or whether each of the simulations passed or failed the pass/fail condition.

In an embodiment of the second aspect, the system under test is remote from the processor and the memory, and receiving the system under test from the user comprises receiving a link to the system under test.

In a third aspect of the present disclosure, a method for performing an electronic simulation of an autonomous vehicle is provided. The method includes: (i) receiving a system under test from a user, the system under test comprising a component of an autonomous vehicle; (ii) receiving an indication of a variable parameter from the user; (iii) determining a first plurality of values of the variable parameter; (iv) performing a first plurality of simulations comprising a respective simulation for each of the first plurality of values; (v) grouping the first plurality of values into two or more clusters according to respective outcomes of the first plurality of simulations; (vi) determining a further plurality of values of the variable parameter according to the clusters; (vii) performing a further plurality of simulations comprising a respective simulation for each of the further plurality of values; (viii) grouping the further plurality of values into the clusters according to respective outcomes of the further plurality of simulations; and (ix) outputting a result of the first plurality of simulations and further plurality of simulations to the user.

In an embodiment of the third aspect, the method, further comprises repeating (vi), (vii), and (viii) until a distance between successive pluralities of values falls below a predetermined threshold or until a predetermined number of simulations has been performed.

In an embodiment of the third aspect, determining a further plurality of values of the variable parameter according to the clusters comprises selecting values of the variable parameter that are between two of the clusters.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for performing an electronic simulation of an autonomous vehicle, the method comprising:
   receiving a system under test from a user, the system under test comprising a component of an autonomous vehicle;
   receiving a pass/fail condition from the user;
   receiving an indication of a variable parameter from the user;
   determining a plurality of values of the variable parameter;
   creating a respective system under test container instance for each of the plurality of values;
   creating a respective container instance of a simulation engine for each of the plurality of values, each simulation engine container instance linked to a respective system under test container;
   performing, with the simulation container instances, a respective simulation for each of the plurality of values;
   determining, for each of the respective simulations, whether the simulation passed or failed the pass/fail condition; and
   outputting, to the user, a result of the respective simulations.

2. The method of claim 1, wherein the system under test is a sensor, and each simulation engine container instance comprises a body of the autonomous vehicle, one or more performance characteristics of the autonomous vehicle, and a scene, the scene comprising a roadway.

3. The method of claim 2, wherein the variable parameter comprises:
   a latency of the sensor;
   an environmental error respective of the sensor;
   a hardware error respective of the sensor;
   a hardware setting of the sensor;
   a position-based or arrangement-based error of the sensor; or
   a firmware setting of the sensor.

4. The method of claim 1, wherein determining a plurality of values of the variable parameter comprises:
   determining a value space for the variable parameter; and
   selecting the plurality of values randomly from within the value space.

5. The method of claim 1, wherein the plurality of values is a first plurality of values, the simulation engine container instances are a first plurality of simulation engine container instances, and the simulations are a first plurality of simulations, and the method further comprises:
   grouping the first plurality of values into two or more clusters according to whether each of the first plurality of simulations passed or failed the pass/fail condition;
   selecting a second plurality of values according to the clusters;
   creating a second plurality of simulation engine container instances comprising a respective container instance of the simulation engine for each of the second plurality of values, each container instance in the second plurality of container instances linked to a respective system under test container;
   performing, with the second plurality of simulation container instances, a second plurality of simulations comprising a respective simulation for each of the second plurality of values;
   determining, for each of the second plurality of respective simulations, whether the simulation passed or failed the pass/fail condition; and
   outputting, to the user, a result of the second plurality of respective simulations.

6. The method of claim 1, further comprising:
   designating a body of the autonomous vehicle;
   designating performance characteristics of the autonomous vehicle;
   designating a sensor arrangement of the autonomous vehicle; and
   designating a control logic for the autonomous vehicle;
   wherein each system under test container instance and the associated simulation engine container instance collectively comprise the body, the performance characteristics, the sensor arrangement, and the control logic.

7. The method of claim 1, further comprising:
   designating a roadway;
   determining one or more environmental conditions; and
   determining one or more traffic vehicles;
   wherein each simulation engine container instance comprises the roadway, the one or more environmental conditions, and the one or more traffic vehicles.

8. The method of claim 1, wherein outputting, to the user, a result of the respective simulations comprises outputting one or more of:
   a 4D visualization of the autonomous vehicle in at least one of the simulations;
   sensor data playback in at least one of the simulations;
   a log file display of one or more of the simulations;
   a code trace in the system under test in at least one of the simulations; or
   whether each of the simulations passed or failed the pass/fail condition.

9. A system for performing an electronic simulation of an autonomous vehicle, the system comprising:
   a processor; and
   a non-volatile computer-readable memory storing instructions that, when executed by the processor, cause the processor to:

receive a system under test from a user, the system under test comprising a component of an autonomous vehicle;

receive a pass/fail condition from the user;

receive an indication of a variable parameter from the user;

determine a plurality of values of the variable parameter;

create a respective system under test container instance for each of the plurality of values;

create a respective container instance of a simulation engine for each of the plurality of values, each simulation engine container instance linked to a respective system under test container;

perform, with the simulation container instances, a respective simulation for each of the plurality of values;

determine, for each of the respective simulations, whether the simulation passed or failed the pass/fail condition; and output, to the user, a result of the respective simulations.

10. The system of claim 9, wherein the system under test is a sensor, and each simulation engine container instance comprises a body of the autonomous vehicle, one or more performance characteristics of the autonomous vehicle, and a scene, the scene comprising a roadway.

11. The system of claim 10, wherein the variable parameter comprises:

a latency of the sensor;

an environmental error respective of the sensor;

a hardware error respective of the sensor;

a hardware setting of the sensor;

a position-based or arrangement-based error of the sensor; or a firmware setting of the sensor.

12. The system of claim 9, wherein determining a plurality of values of the variable parameter comprises:

determining a value space for the variable parameter; and selecting the plurality of values randomly from within the value space.

13. The system of claim 9, wherein the plurality of values is a first plurality of values, the simulation engine container instances are a first plurality of simulation engine container instances, and the simulations are a first plurality of simulations, and the memory stores further instructions that, when executed by the processor, cause the processor to:

group the first plurality of values into two or more clusters according to whether each of the first plurality of simulations passed or failed the pass/fail condition;

select a second plurality of values according to the clusters;

create a second plurality of simulation engine container instances comprising a respective container instance of the simulation engine for each of the second plurality of values, each container instance in the second plurality of container instances linked to a respective system under test container;

perform, with the second plurality of simulation container instances, a second plurality of simulations comprising a respective simulation for each of the second plurality of values;

determine, for each of the second plurality of respective simulations, whether the simulation passed or failed the pass/fail condition; and output, to the user, a result of the second plurality of respective simulations.

14. The system of claim 9, wherein the memory stores further instructions that, when executed by the processor, cause the processor to:

designate a body of the autonomous vehicle;

designate performance characteristics of the autonomous vehicle;

designate a sensor arrangement of the autonomous vehicle; and designate a control logic for the autonomous vehicle;

wherein each system under test container instance and the associated simulation engine container instance collectively comprise the body, the performance characteristics, the sensor arrangement, and the control logic.

15. The system of claim 9, wherein the memory stores further instructions that, when executed by the processor, cause the processor to:

designate a roadway;

determine one or more environmental conditions; and determine one or more traffic vehicles;

wherein each simulation engine container instance comprises the roadway, the one or more environmental conditions, and the one or more traffic vehicles.

16. The system of claim 9, wherein outputting, to the user, a result of the respective simulations comprises outputting one or more of:

a 4D visualization of the autonomous vehicle in at least one of the simulations;

sensor data playback in at least one of the simulations;

a log file display of one or more of the simulations;

a code trace in the system under test in at least one of the simulations; or whether each of the simulations passed or failed the pass/fail condition.

17. The system of claim 9, wherein the system under test is remote from the processor and the memory, and receiving the system under test from the user comprises receiving a link to the system under test.

18. A method for performing an electronic simulation of an autonomous vehicle, the method comprising:

receiving a system under test from a user, the system under test comprising a component of an autonomous vehicle;

receiving an indication of a variable parameter from the user;

determining a first plurality of values of the variable parameter;

creating a respective system under test container instance for each of the first plurality of values based on the received system under test;

creating a respective container instance of a simulation engine for each of the first plurality of values, each simulation engine container instance linked to a respective system under test container instance;

performing, with the simulation container instances, a first plurality of simulations, the first plurality of simulations comprising a respective simulation for each of the first plurality of values;

grouping the first plurality of values into two or more clusters according to respective outcomes of the first plurality of simulations;

determining a further plurality of values of the variable parameter according to the clusters;

creating a respective system under test container instance for each of the further plurality of values based on the received system under test;

creating a respective container instance of a simulation engine for each of the further plurality of values, each simulation engine container instance for each of the further plurality of values being linked to a respective system under test container instance for each of the further plurality of values;

performing, with the simulation container instances for each of the further plurality of values, a further plurality of simulations, the further plurality of simulations comprising a respective simulation for each of the further plurality of values;

grouping the further plurality of values into the clusters according to respective outcomes of the further plurality of simulations; and outputting a result of the first plurality of simulations and further plurality of simulations to the user.

19. The method of claim 18, further comprising repeating determining a further plurality of values of the variable parameter, performing a further plurality of simulations, and grouping the further plurality of values into the clusters until a distance between successive pluralities of values falls below a predetermined threshold or until a predetermined number of repetitions has been performed.

20. The method of claim 18, wherein determining a further plurality of values of the variable parameter according to the clusters comprises selecting values of the variable parameter that are between two of the clusters.

* * * * *